US011749932B1

(12) United States Patent
Brownell

(10) Patent No.: US 11,749,932 B1
(45) Date of Patent: Sep. 5, 2023

(54) WEATHER RESISTANT ELECTRICAL COVER

(71) Applicant: Roy Brownell, Olathe, KS (US)

(72) Inventor: Roy Brownell, Olathe, KS (US)

( * ) Notice: Subject to any disclaimer, the term of this patent is extended or adjusted under 35 U.S.C. 154(b) by 0 days.

(21) Appl. No.: 17/842,614

(22) Filed: Jun. 16, 2022

(51) Int. Cl.
*H01R 13/447* (2006.01)
*H01R 13/453* (2006.01)

(52) U.S. Cl.
CPC ................................ *H01R 13/4532* (2013.01)

(58) Field of Classification Search
CPC ............ H01R 13/4532; H01R 13/4536; H01R 13/447
USPC ............................................................ 439/67
See application file for complete search history.

(56) References Cited

U.S. PATENT DOCUMENTS 3,491,327 A 1/1970 Tait et al.
4,793,818 A 12/1988 Poirier
4,810,833 A * 3/1989 Meyers .................... H02G 3/14 174/67
5,078,614 A 1/1992 Shotoy
5,107,075 A 4/1992 Currier, Jr.
5,763,831 A * 6/1998 Shotey ..................... H02G 3/14 174/67
5,935,845 A 8/1999 Lacy
6,737,576 B1 * 5/2004 Dinh ........................ H02G 3/14 174/53
7,071,415 B1 * 7/2006 Shotey ..................... H02G 3/14 174/67
7,462,777 B2 * 12/2008 Dinh ...................... H02G 3/088 174/67
7,484,973 B2 2/2009 Westhoff
7,598,453 B1 * 10/2009 Shotey ..................... H02G 3/14 174/67
7,626,121 B1 * 12/2009 Cleghorn ................. H02G 3/14 174/67
7,915,528 B2 3/2011 Ni
9,203,222 B2 * 12/2015 Korcz .................... H02G 3/088
9,935,436 B1 * 4/2018 Baldwin .................. H02G 3/14
10,749,292 B2 8/2020 Mortun
2005/0082081 A1 * 4/2005 Marcou .................... H02G 3/14 174/67
2006/0231282 A1 * 10/2006 Greenfield ............... H02G 3/14 174/67
2008/0047730 A1 * 2/2008 Johnson ................... H02G 3/14 174/67
2008/0223601 A1 * 9/2008 Johnson ................. H02G 3/088 174/67
2008/0296039 A1 * 12/2008 Dinh ........................ H02G 3/14 174/53
2009/0283291 A1 * 11/2009 Ni ...................... H01R 13/5213 174/67
2010/0181091 A1 * 7/2010 Drane ...................... H02G 3/14 174/66

(Continued)

FOREIGN PATENT DOCUMENTS

CA 1144271 A 4/1983

*Primary Examiner* — Harshad C Patel
(74) *Attorney, Agent, or Firm* — Weiss & Moy, PC; Jeffrey D. Moy

(57) ABSTRACT

A weatherproof electrical cover for an electrical outlet having an electrical cover plate has a base having an open back surface. An opening is formed in a front surface of the base. A lid is hingly coupled to a front surface of the base. A securing device attaches the base over the electrical cover plate.

20 Claims, 2 Drawing Sheets

(56) References Cited

U.S. PATENT DOCUMENTS

2017/0237198 A1* 8/2017 Sathyanarayana ... H01R 25/006
439/105
2019/0319391 A1* 10/2019 Thomas ............. H01R 13/5213

* cited by examiner

WEATHER RESISTANT ELECTRICAL COVER

TECHNICAL FIELD

The present application generally relates to an electrical outlet, and more specifically, to a weather resistant cover which slides over an existing electrical plate to protect the electrical outlet from the elements.

BACKGROUND

Electrical outlets may be placed in outdoor locations for various reasons. For example, these outdoor electrical outlets may be used to plug in various electrical tools; outdoor appliances, such as electric weed trimmers, electric lawn mowers, and the like; sprinkler systems; outdoor lighting, controlling outdoor electrical components and the like. These outdoor electrical outlets may be more vulnerable to contamination from dirt, water and other foreign matter than indoor electrical outlets. As a result, many outdoor electrical outlets are usually provided with some type of protective cover for preventing the entry of contaminants.

Most all weatherproof electrical covers need to be installed when installing the electrical wall box. Presently, the most common type of outdoor cover is a flat metal cover that includes a spring biased metal plate that is hingedly connected to the electrical wall box wherein the hinge is built into the electrical wall box. The metal cover pivots from a closed position covering and tightly sealing the outlet receptacles to an open position allowing access to the outlet receptacles.

Thus, for many outdoor electrical outlets, if they were not installed with the above type of weatherproof electrical cover that are built into the electrical wall box, it is difficult to retrofit these outdoor electrical outlets to have weatherproof electrical covers. One way to retrofit existing outdoor electrical outlets to have a weatherproof electrical cover would be to replace the current electrical wall box with one that has a built in weatherproof electrical cover. This is extremely time consuming.

Therefore, it would be desirable to provide a device and method that overcomes the above. The device and method would provide a weatherproof cover which slides over an existing electrical plate to protect the electrical outlet from the elements.

SUMMARY

In accordance with one embodiment, a weatherproof electrical cover for an electrical outlet having an electrical cover plate is disclosed. The weatherproof electrical cover has a base having an open back surface. An opening is formed in a front surface of the base. A lid is hingly coupled to a front surface of the base. A securing device attaches the base over the electrical cover plate.

A weatherproof electrical cover for an electrical outlet having an electrical cover plate has a base having an open back surface. An opening is formed in a front surface of the base. A lid is hingly coupled to a front surface of the base. A plate member is positioned behind the electrical cover plate. An electrical outlet opening is formed in the plate member. A groove is formed around a portion of the perimeter of the plate member. A ridge is formed around a portion of the open back surface, the ridge engaging the groove attaching the base over the electrical cover plate.

A weatherproof electrical cover for an electrical outlet having an electrical cover plate has a base having an open back surface. An opening is formed in a front surface of the base. A lid is hingly coupled to a front surface of the base. A lid is hingly coupled to a front surface of the base. A tab is formed on the lid. An upside down "U" shaped plate is provided and has an area between legs forming the upside down "U" shaped plate forming an electrical outlet opening. A groove is formed around a top edge of the upside down "U" shaped plate and along an outside edge of each leg forming upside down "U" shaped plate. A ridge is formed around a portion of the open back surface, the ridge engaging the groove attaching the base over the electrical cover plate.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary weatherproof electrical cover may be used with existing electrical outlet plates. The weatherproof electrical cover may slide over an existing electrical plate to protect electrical outlet from the elements.

Figure 1:
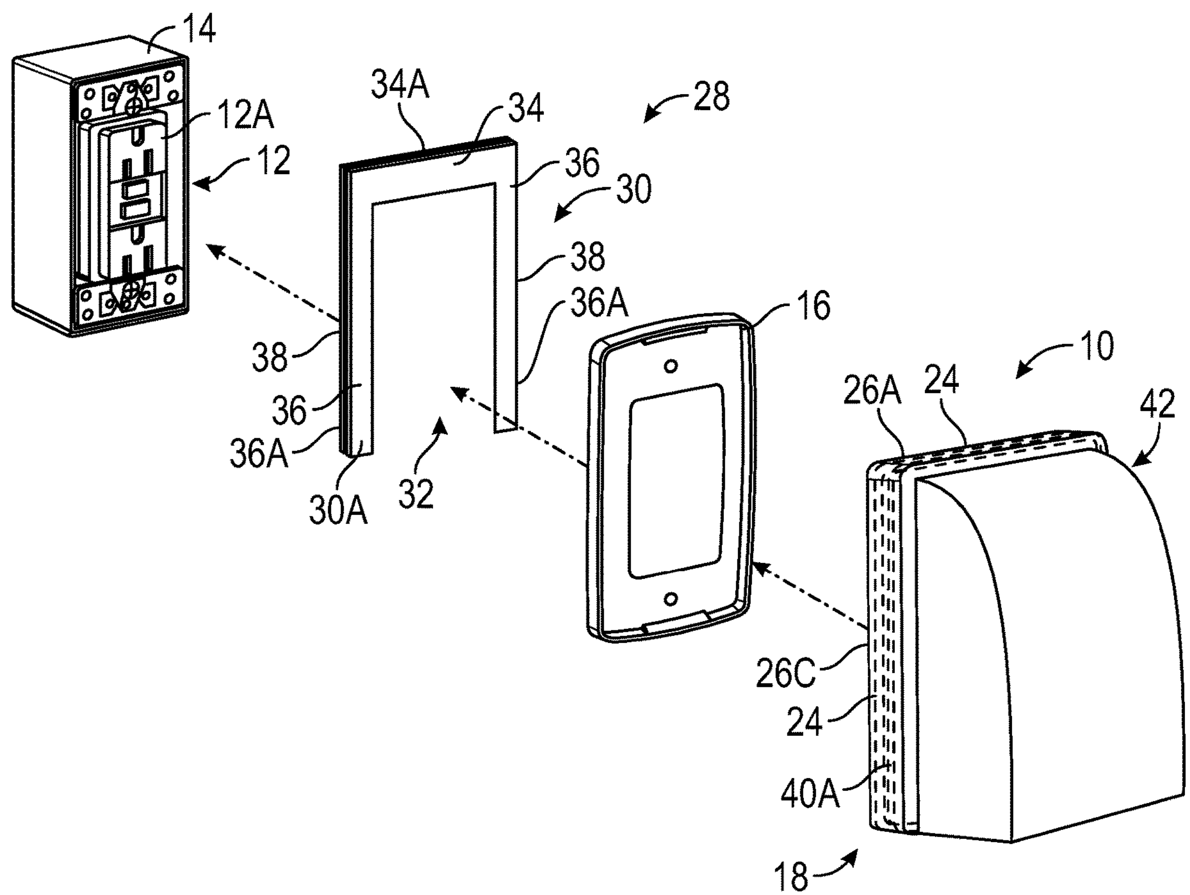
FIG. 1 is an exploded perspective view of an exemplary embodiment of a waterproof cover for use with an existing electrical outlet box and cover, in accordance with an aspect of the present invention.
Figure 2:
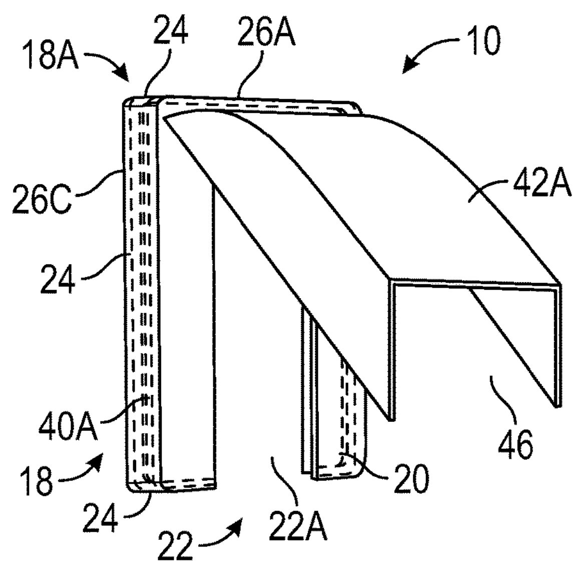
FIG. 2 is a perspective view of an exemplary embodiment of the waterproof cover of FIG. 1, in accordance with an aspect of the present invention.
Figure 3:
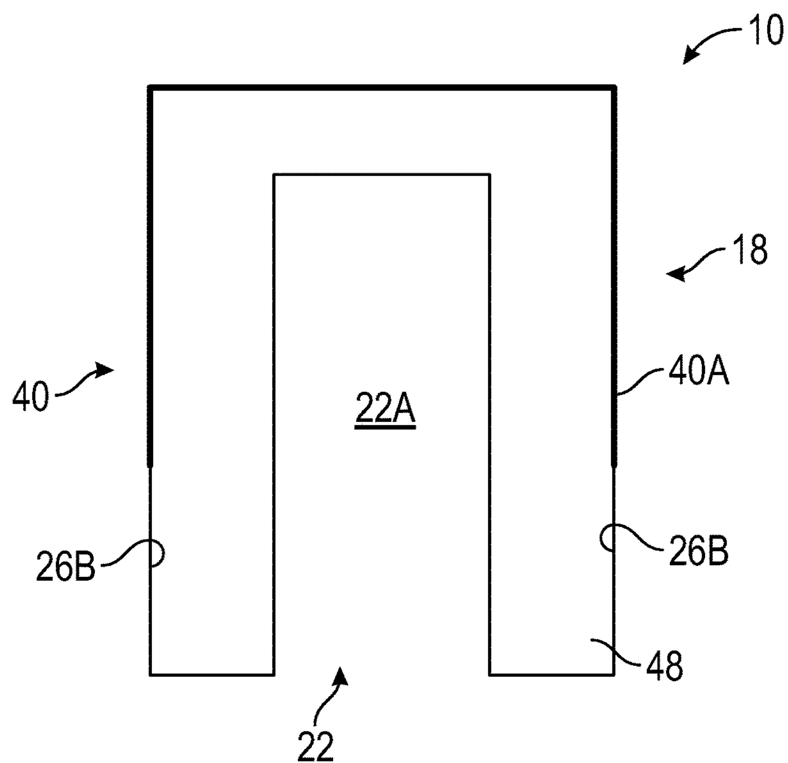
FIG. 3 is a rear view of an exemplary embodiment of the waterproof cover of FIG. 1, in accordance with an aspect of the present invention.
Figure 4:
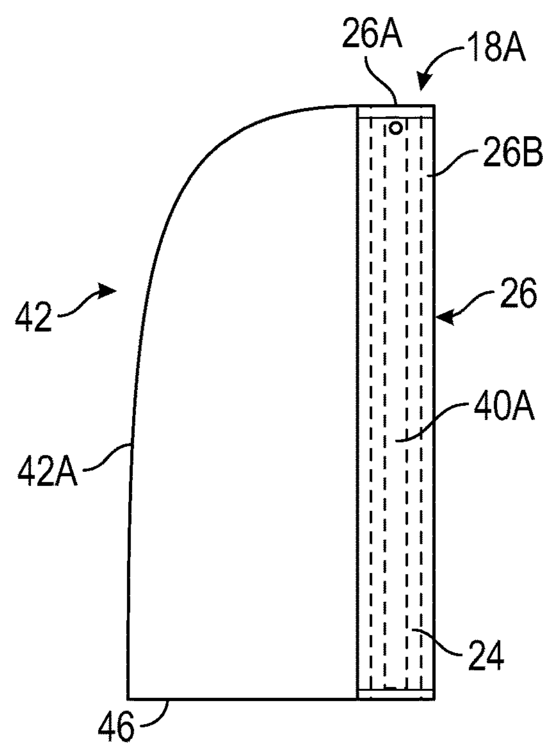
FIG. 4 is a side view of an exemplary embodiment of the waterproof cover of FIG. 1, in accordance with an aspect of the present invention.

Referring to FIGS. 1-4, a weatherproof electrical outlet cover 10 (hereafter cover 10) may be seen. The cover 10 may be used to cover and protect existing outlets 12 from water, dust, and other elements. Most electrical outlets 12 may be installed within an electrical box 14 which may be installed within a wall of a building or other structure. An electrical outlet plate 16 may be poisoned over an opening within the electrical box 14. While the electrical outlet plate 16 may prevent larger items from getting into the electrical box 14, the electrical outlet plate 16 does little to nothing to protect the electrical outlets 12 from the elements.

As may be seen in the figures, the cover 10 may have a base 18. The base 18 may be formed of a front plate 20. The front plate 20 may have an opening 22 formed in a central area thereof. The opening 22 may be sized to expose a front of the electrical outlets 12. Specifically, the receptacles 12A of the electrical outlets 12. In accordance with the present embodiment, the opening 22 may be an upside down "U" shape opening 22A.

Sidewalls 24 may extend down from each side of the front plate 20 to form a shallow box 18A having an open back surface 26. The base 18 may be formed of different materials. In accordance with one embodiment, the base may be formed of a rustproof material. For example, a polycarbonate material, a lightweight metal such as aluminum or similar materials may be used.

The device 10 may have a securing device 28 to attach the cover 10 over the electrical outlet plate 16. In accordance with one embodiment, the securing device 28 may be formed of a plate 30. The plate 30 may have an opening 32 formed therein. The opening 32 may be sized to expose the front of the electrical outlets 12 when properly installed. The plate 30 may be positioned behind the electrical outlet plate 16 as will be disclosed below. Once positioned behind the electrical outlet plate 16, the base 18 may be attach to the plate 30 thereby securing the device 10 over the electrical outlet plate 16.

In accordance with one embodiment, the plate 30 may be an upside-down "U" shaped plate 30A. The upside-down "U" shaped plate 30A may have top member 34. Leg members 36 may extend down from the top member 34 to form the upside down "U" shaped plate 30A. The area between the leg members 36 may form the opening 32. The perimeter of the upside-down U" shaped plate 30A may be larger than the perimeter of the electrical outlet plate 16. Thus, when the upside-down "U" shaped plate 30A is positioned behind the electrical outlet plate 16, the perimeter of the upside-down "U" shaped plate 30A may extend beyond the perimeter of the electrical outlet plate 16.

A groove 38 may be formed around a portion of the perimeter of the upside-down "U" shaped plate 30A. The groove 38 may be used to allow the base 18 to engage and attach to the plate 30 thereby securing the device 10 over the electrical outlet plate 16. In accordance with one embodiment, the groove 38 may be formed in a top edge 34A of the top member 34 and the outer side edge 36A facing away from the opening 32 of each leg member 36.

A securing device 40 may be formed on a perimeter of a portion of the open back surface 26. The securing device 40 may be used to secure the cover 10 to the plate 30 and/or the upside-down "U" shaped plate 30A in order to cover the electrical outlet plate 16 as disclosed below. In accordance with one embodiment, the securing device 40 may be a ridge 40A. The ridge 40A may be formed along the top edge 26A of the open back surface 26 and down the parallel side edges 26B and 26C of the open back surface 26. In accordance with one embodiment, the ridge 40A may engage the groove 38 formed around a portion of the perimeter of the upside-down "U" shaped plate 30A to secure the cover 10 to the plate 30 and/or the upside-down "U" shaped plate 30A.

A lid 42 may be rotateably coupled to the base 18. The lid 42 may be used to cover the opening 18 formed in the front plate 20 of the base 18. In accordance with one embodiment, the lid 42 may be a semi-spherical lid 42A having a rounded top 44 and an open bottom 46. The lid may have a depth to allow an electrical cord to be inserted in one of the receptacles 12A of the electrical outlets 12 and out of the open bottom 46. A hinge or similar device may be used to rotatably attach the lid 42 to the front plate 20 of the base 18. In accordance with one embodiment, a spring-loaded hinge may be used. The lid 42 may be formed of the same material as the base 18.

An insulating material 48 may be positioned within the interior of the shallow box 18A. The insulating material 48 may be positioned around the opening 22 formed in the front plate 20.

In operation, the user may loosen a screw which may connect the electrical outlet plate 16 from the electrical outlets 12. The screw only needs to be loosened enough to form a gap between the electrical outlet plate 16 from the electrical outlets 12. The plate 30 and/or the upside-down "U" shaped plate 30A may be positioned behind the electrical outlet plate 16 so that the electrical outlets 12 in positioned within the opening 32. The electrical outlet plate 16 may then be tightened to secure the plate 30 and/or the upside-down "U" shaped plate 30A may be positioned behind the electrical outlet plate 16 so that the perimeter of the plate 30 and/or the upside-down "U" shaped plate 30A may extend past the perimeter of the electrical outlet plate 16. The cover 10 may then be positioned above the electrical outlet plate 16 with the rear of the cover 10 facing towards the outlet plate 16. The cover 10 may be lowered so that the ridge 40A may engage the groove 38 formed around a portion of the perimeter of the upside-down "U" shaped plate 30A to secure the cover 10 to the plate 30 and/or the upside-down "U" shaped plate 30A.

The foregoing description is illustrative of particular embodiments of the application but is not meant to be a limitation upon the practice thereof. For example, while the cover 10 may be described as being formed of multiple pieces, the cover 10 ay be formed of a single piece with the hinged lid 42. The following claims, including all equivalents thereof, are intended to define the scope of the application.

What is claimed is:

1. A weatherproof electrical cover for an electrical outlet having an electrical outlet plate comprising:
- a base having an open back surface;
- an opening formed in a front surface of the base;
- a lid hingly coupled to a front surface of the base;
- a securing device positioned behind the electrical outlet plate, wherein the securing device extends beyond an outer perimeter of the electrical outlet plate, the base sliding onto the securing device extending beyond the outer perimeter of the electrical outlet plate attaching the base to the securing device so the lid is positioned over the electrical outlet plate.

2. The weatherproof electrical cover of claim 1, wherein the securing device comprises:
- a plate member, wherein the plate member extends beyond the outer perimeter of the electrical outlet plate when positioned behind the electrical outlet plate;
- an electrical outlet opening formed in the plate member;
- a groove formed around a portion of an outer perimeter of the plate member; and
- a ridge formed around a perimeter of the base, the ridge engaging the groove attaching the base to the plate member and positioning the lid over the electrical outlet plate.

3. The weatherproof electrical cover of claim 2, wherein the plate is an upside down "U" shaped plate, an area between legs forming the upside down "U" shaped plate forming the electrical outlet opening.

4. The weatherproof electrical cover of claim 3, wherein the groove is formed along a top edge of the upside down "U" shaped plate and down an outside edge of each leg forming the upside down "U" shaped plate.

5. The weatherproof electrical cover of claim 1, wherein the base comprises:

a front plate; and sidewalls extending down around a perimeter of the front plate forming a container with the open back surface.

6. The weatherproof electrical cover of claim 1, comprising a tab formed on the lid.

7. The weatherproof electrical cover of claim 1, comprising insulation stored within the base.

8. The weatherproof electrical cover of claim 1, wherein the base and the lid are formed of a same material.

9. The weatherproof electrical cover of claim 1, wherein the base and the lid are formed of a polycarbonate material, aluminum or like materials.

10. A weatherproof electrical cover for an electrical outlet having an electrical outlet plate comprising:

a base having an open back surface;

an opening formed in a front surface of the base;

a lid hingly coupled to a front surface of the base;

a plate member positioned behind the electrical cover plate, wherein the plate member extends beyond an outer perimeter of the electrical outlet plate when positioned behind the electrical outlet plate;

an electrical outlet opening formed in the plate member;

a groove formed around a portion of an outer perimeter of the plate member; and a ridge formed around a portion of a perimeter of the base, the ridge engaging the groove attaching the base over the electrical cover plate.

11. The weatherproof electrical cover of claim 10, wherein the plate is an upside down "U" shaped plate, an area between legs forming the upside down "U" shaped plate forming the electrical outlet opening.

12. The weatherproof electrical cover of claim 11, wherein the groove is formed along a top edge of the upside down "U" shaped plate and down an outside edge of each leg forming the upside down "U" shaped plate.

13. The weatherproof electrical cover of claim 10, wherein the base comprises:

a front plate; and sidewalls extending down around a perimeter of the front plate forming a container with the open back surface;

wherein the ridge is formed around a portion of a perimeter of the sidewalls.

14. The weatherproof electrical cover of claim 10, comprising a tab formed on the lid.

15. The weatherproof electrical cover of claim 10, comprising insulation stored within the base.

16. A weatherproof electrical cover for an electrical outlet having an electrical outlet plate comprising:

a base having an open back surface;

an opening formed in a front surface of the base;

a lid hingly coupled to a front surface of the base;

a tab formed on the lid;

an upside down "U" shaped plate, an area between legs forming the upside down "U" shaped plate forming an electrical outlet opening, wherein the upside down "U" shaped plate extends beyond an outer perimeter of the electrical outlet plate when positioned behind the electrical outlet plate;

a groove formed around a top edge of the upside down "U" shaped plate and along an outside edge of each leg forming upside down "U" shaped plate; and a ridge formed around a portion of a perimeter of the base the ridge engaging the groove attaching the base to the upside down "U" shaped plate and securing the lid over the electrical outlet plate.

17. The weatherproof electrical cover of claim 16, wherein the base comprises:

a front plate; and sidewalls extending down around a perimeter of the front plate forming a container with the open back surface;

wherein the ridge is formed around a portion of a perimeter of the sidewalls.

18. The weatherproof electrical cover of claim 16, comprising insulation stored within the base.

19. The weatherproof electrical cover of claim 16, wherein the base and the lid are formed of a same material.

20. The weatherproof electrical cover of claim 16, wherein the base and the lid are formed of a polycarbonate material, aluminum or like materials.

* * * * *